United States Patent [19]
Robinson

[11] 4,196,597
[45] Apr. 8, 1980

[54] FLEXIBLE SHAFT COUPLINGS WITH AXIALLY SPACED DIAPHRAGMS

[75] Inventor: Robert P. Robinson, Oldham, England

[73] Assignee: Burmah Engineering Company Limited, Manchester, England

[21] Appl. No.: 799,819

[22] Filed: May 23, 1977

[30] Foreign Application Priority Data

May 21, 1976 [GB] United Kingdom ............... 21166/76

[51] Int. Cl.$^2$ ................................................ F16D 3/78
[52] U.S. Cl. ........................................ 64/13; 64/15 B; 64/15 R
[58] Field of Search ..................... 64/13, 15 B, 15 R

[56] References Cited

U.S. PATENT DOCUMENTS

| 1,322,128 | 11/1919 | Ludeman | 64/13 |
| 3,500,658 | 3/1970 | Goody | 64/13 |
| 3,654,775 | 4/1972 | Williams | 64/13 |
| 3,759,063 | 9/1973 | Bendall | 64/13 |

FOREIGN PATENT DOCUMENTS 924796  5/1963  United Kingdom ..................... 64/13

Primary Examiner—Charles J. Myhre
Assistant Examiner—R. C. Turner
Attorney, Agent, or Firm—Sughrue, Rothwell, Mion, Zinn and Macpeak

[57] ABSTRACT

A coupling for drivingly connecting power transmission shafts, has input and output members interconnected by axially-spaced flexible diaphragm means which permit axial freedom without angular movement of their axes as defined by inner and outer concentric spacer components to each end of which the diaphragm means are attached.

5 Claims, 4 Drawing Figures

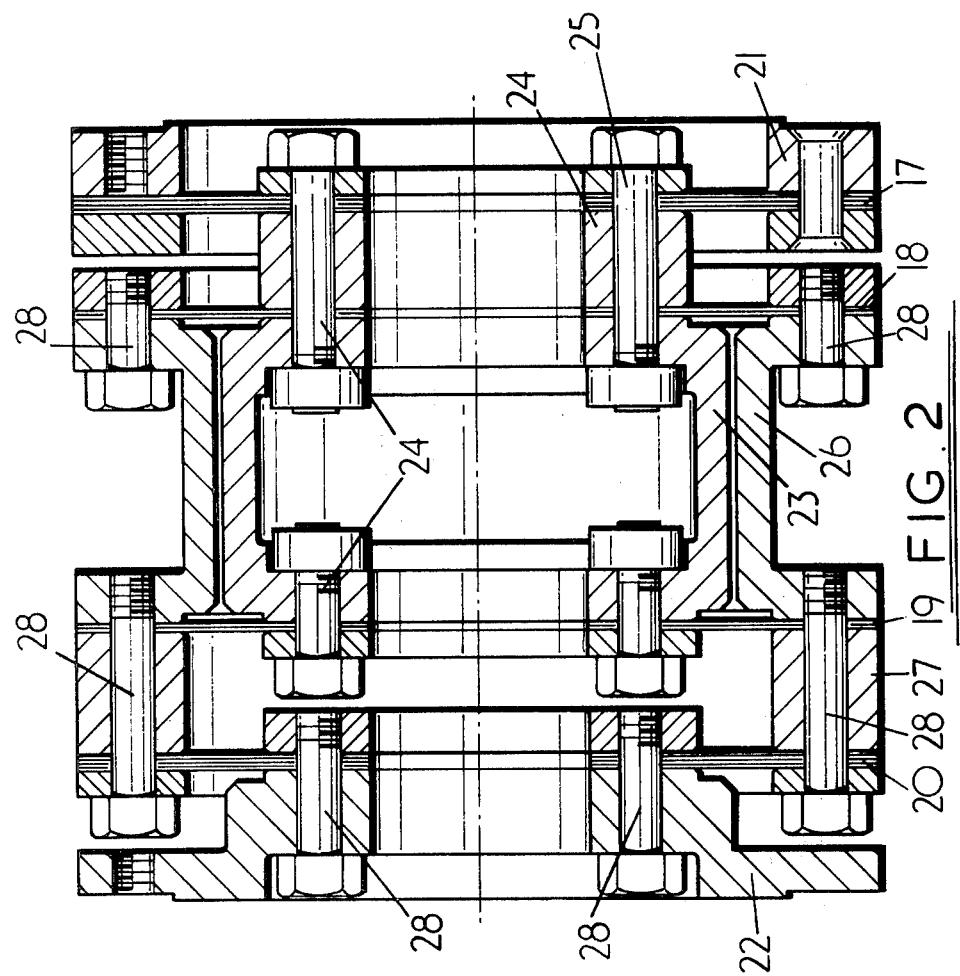

FLEXIBLE SHAFT COUPLINGS WITH AXIALLY SPACED DIAPHRAGMS

BACKGROUND OF THE INVENTION

This invention relates to couplings for drivingly connecting power transmission shafts.

There are many industrial applications where it is required to connect the ends of two power transmission shafts together in such a manner that, whilst torsional and radial rigidity is maintained, the connecting coupling or device allows the shafts to move relative to one another along their common axis. A typical source of such relative movement might be where the two shafts are respective output and input shafts of a prime mover and a piece of driven machinery, for example turbine and compressor. Depending on the relative dispositions of foundation attachment points, locating thrust bearings and other factors of say, the turbine and compressor, the normal temperature changes in operation of such an assembly of machinery will produce thermal expansion or contraction of the distance between the two opposed shaft ends.

Usually the coupling for such an installation will also incorporate means for allowing angular and lateral relative displacement of the shaft centre lines, for example two hooks joints separated by a cardan shaft, but often as with the hooks joint there is either nil or insufficient freedom for relative axial displacement. The present invention is concerned with such freedom for purely axial displacement.

The invention has several important advantages over some of the existing devices which already perform the function described above. For instance, it does not involve frictional sliding motion, requires no lubrication and retains a high degree of rigidity throughout its working life against torsional, angular and lateral (radial) relative movement of the shaft connection.

In order to understand what these advantages mean in terms of coupling operation, it is best first to examine a typical form of axially sliding shaft coupling for example a splined joint, and show some of its disadvantages.

In the splined joint, torsional drive is transmitted through mating male and female splines, which allow freedom of axial movement within certain limits as dictated by the particular design of coupling. Because the contact pressures on the flanks of the splines are usually fairly high, it is necessary to introduce some form of lubrication, not only to retard wear, but also to minimise sliding frictional forces. Otherwise, excessive axial loads could be applied to the shaft supporting bearings when relative axial movement was imposed. The introduction and retention of such lubrication, particulary in high speed applications, can be extremely complex and costly.

Some degree of clearance between male and female components is always required, both in the interest of manufacturing tolerances and to allow ingress of lubricant. It is inherent in the design therefore, that torsional backlash and some lack of radial and angular rigidity will inevitably be present, even with the coupling in new condition.

When wearing of the splines takes place in service, two important effects are produced. The first is increased backlash, radial and angular, freedoms of movement, which if the coupling is on a high speed application, will cause increased out-of-balance forces to be generated i.e. vibration. The second and possibly more damaging is that spline wear may occur when the coupling runs for long periods in one axial position, such that a step is formed in each of the splines. If the coupling is then required to accommodate shaft movement which means overriding this step with torque applied then very high axial loads may be produced, with consequent damage to the shaft bearings.

The coupling of the present invention obviates or mitigates both these disadvantages and requires no lubrication.

SUMMARY OF THE INVENTION

According to an aspect of the present invention there is provided a coupling for drivingly connecting power transmission shafts, the coupling comprising input and output members interconnected by axially-spaced flexible diaphragm means which permit axial freedom without angular movement of their axes, as defined by inner and outer concentric spacer components to each end of which the diaphragm means are attached.

Additional axially spaced diaphragm means can be provided to increase the axial freedom available and simultaneously to provide limited angular movement.

The diaphragms are preferably laminated and may have radial, tangential or any other form of driving link.

Alternatively, full solid disc diaphragms may be used although the latter would normally result in a fairly restricted degree of axial freedom.

A secondary feature of the invention is that by designing the inner and outer concentric spacer components connecting the two or more groups of diaphragms to have equal torsional stiffness the torsional driving load may be distributed evenly among the diaphragms. In this way the total number of diaphragms used may be minimised for a given torque transmission capacity in the interest of economy and low axial stiffness.

Embodiments of the invention will now be described, by way of example, with reference to the accompanying drawings, in which:

BRIEF DESCRIPTION OF THE DRAWINGS

FIGS. 1, 2 and 3 shows cross-sectional views of three different embodiments of flexible couplings in accordance with the present invention.

DETAILED DESCRIPTION OF THE PREFERRED EMBODIMENTS

Figure 1:
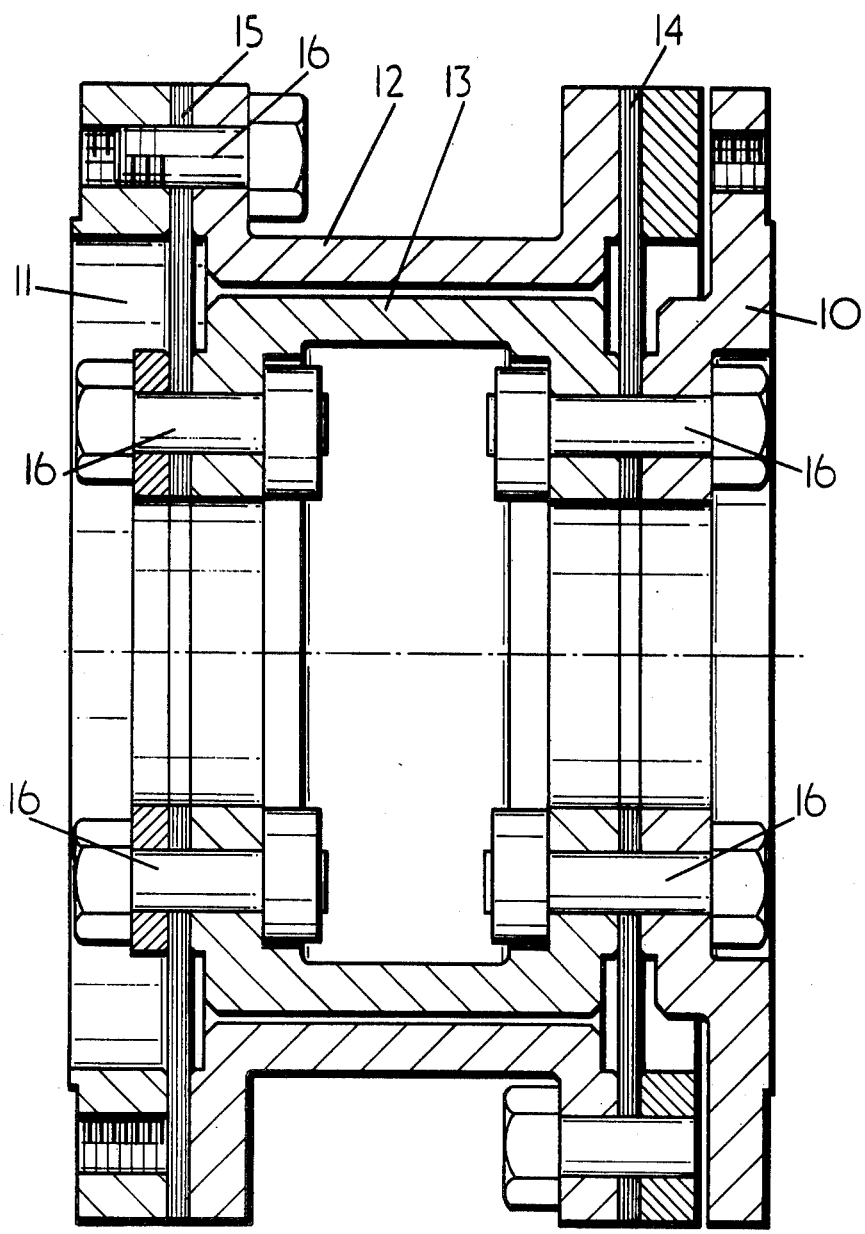

In the first embodiment, the coupling comprises input and output members 10 and 11 between which are disposed inner and outer concentric annular spacers 12, 13 which serve axially to space two banks of laminated flexible diaphragms 14 and 15 which interconnect the input and output members. The input coupling member 10 is connected to the axially-spaced banks of flexible diaphragms 14, 15 by the inner spacer 13 while the output coupling member 11 is similarly connected by the outer spacer 12. The driving links between the coupling components are indicated at 16.

This arrangement gives purely axial flexibility to the coupling. This is achieved by axial movement of spacer 12 relative to spacer 13 due to minute stretch of the diaphragms 14 and 15. Since each stretches equally the inner spacer 13 must move on the same axis as the outer spacer 12.

In the following two further embodiments in which the invention is applied to more conventional couplings these have increased axial flexibility and some angular flexibility.

In the second embodiment (FIG. 2), four banks 17 to 20 of axially-spaced laminated flexible diaphragms are employed between the coupling members 21 and 22.

The input coupling member 21 is connected to three adjacent axially-spaced banks 17 to 19 of flexible diaphragms by inner spacers 23 and 24 and driving bolts 25 while the output coupling member 22 is connected to three adjacent axially-spaced banks 20 to 18 of flexible diaphragms by outer spacers 26 and 27 and driving bolts 28. The inner and outer spacers are concentric.

This embodiment therefore includes additional diaphragms which serve to increase the axial freedom while, at the same time, permitting angular movement between the input and output members.

In the embodiments so far described each diaphragm consists of an inner and outer ring joined by radial spokes, the sections of FIGS. 1 and 2 passing through these spokes.

In the third embodiment (FIGS. 3 and 4), there is again employed four banks 28 to 31 of laminated flexible diaphragms disposed between the coupling members 32 and 33 and axially spaced by concentric inner and outer spacers 34 to 37.

Figure 4:
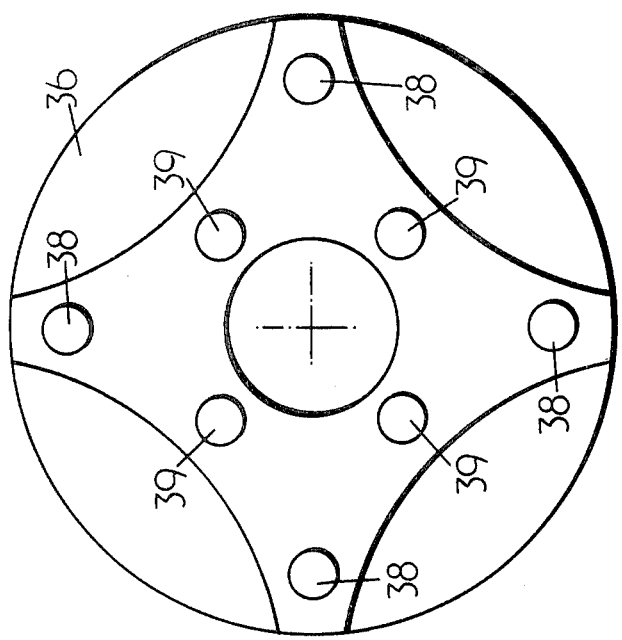
FIG. 4 shows a plan view of a flexible diaphragm for use in the embodiment of FIG. 3.
Figure 3:
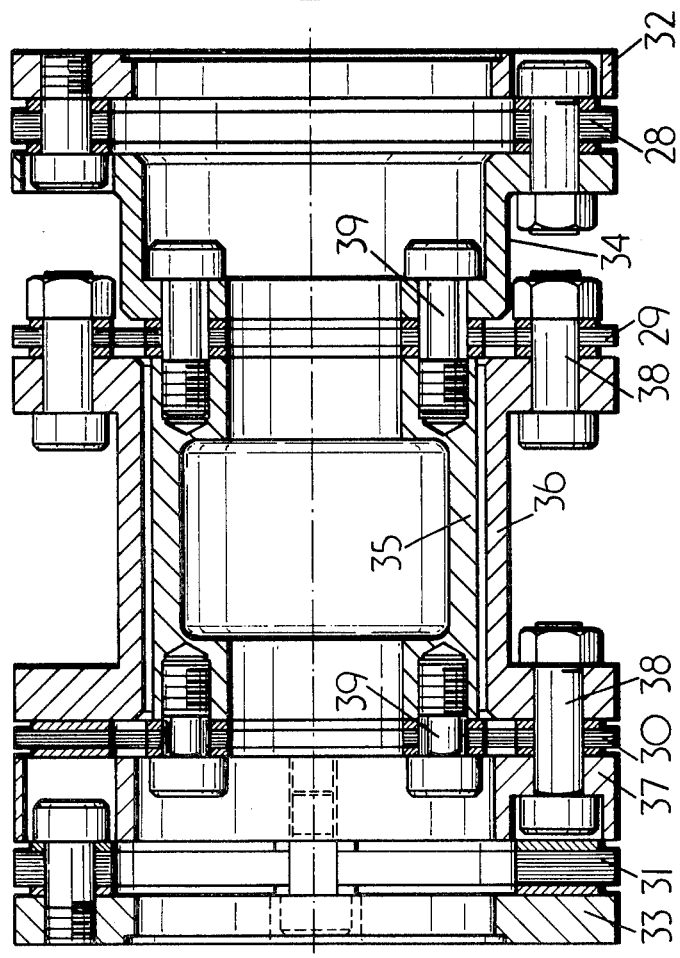

In FIG. 4 is shown the form of diaphragms in which driving bolts 38 and 39 are as shown in FIG. 3. These permit a more tangential transmission of torque between the bolts 38 and 39 which are each attached to driving members adjacent to the diaphragm concerned.

This permits a more direct loading path than the radial spokes shown in FIGS. 1 and 2.

What is claimed is:

1. A flexible shaft coupling, comprising:
   (a) axially aligned and spaced input and output members,
   (b) inner and outer concentric spacer components disposed between said input and output members,
   (c) a pair of spaced flexible diaphragms each attached to both of said inner and outer concentric spacer components,
   (d) means connecting said input member to one of said concentric spacer components, and
   (e) means connecting said output member to the other one of said concentric spacer components, whereby only relative axial movement is possible between said input and output members.

2. A coupling as claimed in claim 1, in which the inner and outer concentric spacer components have equal torsional stiffness.

3. A flexible shaft coupling as claimed in claim 1, comprising first driving links connecting the input member to the inner concentric spacer component and traversing one of said flexible diaphragms, and second driving links connecting the inner concentric spacer component to the other one of said flexible diaphragms.

4. A flexible shaft coupling as claimed in claim 3, comprising third driving links connecting said one flexible diaphragm to the outer concentric spacer component, and fourth driving links connecting said outer concentric spacer component to said output member and traversing said other flexible diaphragm.

5. A flexible shaft coupling as claimed in claim 1, wherein the flexible diaphragms are laminated.

* * * * *